United States Patent
Oommen et al.

(10) Patent No.: US 12,435,360 B2
(45) Date of Patent: Oct. 7, 2025

(54) REACTION CONDITION COMPOSITION FOR CIRCULARIZING OLIGONUCLEOTIDE PROBES

(71) Applicant: STEM ARTS PROJECTS, LLC, Lincoln, NE (US)

(72) Inventors: Abraham Oommen, Lincoln, NE (US); Heather Piscatelli, Lincoln, NE (US); Alyssa Hangman, Lincoln, NE (US)

(*) Notice: Subject to any disclaimer, the term of this patent is extended or adjusted under 35 U.S.C. 154(b) by 558 days.

(21) Appl. No.: 16/642,308

(22) PCT Filed: Jan. 11, 2019

(86) PCT No.: PCT/US2019/013222
§ 371 (c)(1),
(2) Date: Feb. 26, 2020

(87) PCT Pub. No.: WO2019/140211
PCT Pub. Date: Jul. 18, 2019

(65) Prior Publication Data
US 2020/0199661 A1    Jun. 25, 2020

Related U.S. Application Data

(60) Provisional application No. 62/616,866, filed on Jan. 12, 2018.

(51) Int. Cl.
*C12Q 1/6827* (2018.01)

(52) U.S. Cl.
CPC ................. *C12Q 1/6827* (2013.01)

(58) Field of Classification Search
CPC ....... C12Q 1/68; C12Q 1/6827; C12Q 1/6858
See application file for complete search history.

(56) References Cited

U.S. PATENT DOCUMENTS

| | | | |
|---|---|---|---|
| 5,426,180 A | 6/1995 | Kool | |
| 2006/0121458 A1* | 6/2006 | Van Eijk | C12Q 1/6827 435/6.12 |
| 2007/0269805 A1 | 11/2007 | Hogers | |
| 2012/0264630 A1 | 10/2012 | Bockelmann et al. | |
| 2014/0120534 A1* | 5/2014 | Bernitz | C12Q 1/6809 435/6.11 |

FOREIGN PATENT DOCUMENTS

| | | |
|---|---|---|
| EP | 08166346.0 | 4/2009 |
| WO | 97/19193 A2 | 5/1997 |
| WO | 00/09738 A1 | 2/2000 |
| WO | 02/068683 A2 | 9/2002 |
| WO | 02/068683 A3 | 9/2002 |
| WO | 2004/092375 A2 | 10/2004 |
| WO | 2004/092375 A3 | 10/2004 |
| WO | 2005/021794 A2 | 3/2005 |
| WO | 2005/021794 A3 | 3/2005 |
| WO | 2005/118849 A1 | 12/2005 |
| WO | WO2014/114956 * | 7/2014 |

OTHER PUBLICATIONS

Vos et al. AFLP : a new technique for DNA fingerprinting. Nucleic Acids Research 23(21) : 4407-4414 (Year: 1995).*
Van Eijk et al., SNPWaveTM: a flexible multiplexed SNP genotyping technology. Nucleic Acids Research 32(4) : e47 (Year: 2004).*
EPO Extended European Search Report issued Nov. 10, 2020 for EP Patent Application No. EP19738548.7, 7 pages.
Supplementary European Search Report issued Nov. 27, 2020 for EP Patent Application No. EP19738548.7, 1 page.
Hyun Young Heo et al: "A valveless rotary microfluidic device for multiplex point mutation identification based on ligation-rolling circle amplification", Biosensors and Bioelectronics, vol. 78, Apr. 1, 2016 (Apr. 1, 2016), pp. 140-146, XP055587119, Amsterdam, NL.
EPO Search Report issued Nov. 27, 2020 for EP Patent Application No. EP19738548.7, 4 pages.
Nilsson, M. et. al. Padlock probes: Circularizing oligonucleotides for localized DNA detection. Science 265, 2085-2088 (1994), 5 pages.
Fire, A. and Xu, S. Rolling Replication of short DNA circles. Proc. Natl. Acad. Scie. USA 92, 4641-4645 (1995), 5 pages.
Baner, J. et. al. Signal amplification of padlock probes by rolling circle replication. Nucleic Acids Research 26 (22), 5073-5078 (1998), 6 pages.
Lizardi, P.M. et al. Mutation detection and single-molecular counting using isothermal rolling-circle amplification. Nature Genetics 19, 225-232, 10 pages.
Qi. X. et. al. L-RCA (ligation rolling circle amplification): a general method for genotyping of single nucleotide polymorphisms (SNPs). Nucleic Acids Research 29(22), e116: 1-7 (2001), 7 pages.
Aruqi, A.F. et. al. High-throughput genotyping of single nucleotide polymorphisms with rolling circle amplification. BMC Genomics 2, 4 (2001), 10 pages.
Pickering, J. et. al. Integration of DNA ligation and rolling circle amplification for the homogenous end-point detection of single nucleotide polymorphisms. Nucleic Acids Research 30 (12), e60:1-7 (2002), 7 pages.
Yan, L. et. al. Isothermal amplified detection of DNA and RNA. Mol.BioSyst. 10, 970-1003 (2014), 34 pages.
Hafner, G.J. et. al. Isothermal Amplification and Multimerization of DNA by Bst DNA Polymerase. BioTechniques 30, 852-867 (2001), 10 pages.
Ragoussis, J. Genotyping Technologies for Genetic Research. Annu. Rev. Genomics Hum. Genet. 10, 117-133 (2009), 20 pages.
Syvanen, A. Accessing genetic variation: Genotyping single nucleotide polymorphisms. Nature Reviews (Genetics) 2, 930-942 (2001), 13 pages.

(Continued)

*Primary Examiner* — Ethan C Whisenant

(57) ABSTRACT

Reaction condition compositions for detecting a genomic variation from a small sample amount from 5 nano grams (ng) to 1 microgram (ug) includes DNA ligase, DNA polymerase, at least one COP, a DNA polymerase buffer, NAD+, at least two primers, and deoxynucleotide triphosphates (dNTPs). Detection of the genomic variation utilizes COPs with increased ligation efficiency and RCA with fluorescence detection due to simultaneous ligation of COPs to CPs and replication of the genomic variation. The reaction condition composition eliminates the need to perform background reduction of un-hybridized or un-ligated COPs.

17 Claims, 16 Drawing Sheets

(56) References Cited

OTHER PUBLICATIONS

Tsuchihashi, Z and Dracopoli, N.C. Progress in high throughput SNP genotyping methods. The Pharmacogenomics Journal 2, 103-110 (2002), 8 pages.
EPO Communication issued Sep. 29, 2021 for EP Patent Application No. EP19738548.7, 4 pages.
ISR/WO issued May 30, 2019 for application PCT/US19/13222, 10 pages.
European Patent Office, Decision to grant a European patent pursuant to Article 97(1) EPC, Nov. 24, 2022, 1 page.

\* cited by examiner

Amplification of Circularized Probes by RCA Using DY636 Labeled Primers

| Reaction Tubes | 5 Minutes | 10 Minutes | 15 Minutes | 30 Minutes | 45 Minutes | 60 Minutes |
|---|---|---|---|---|---|---|
| 11, No Probe | 3,276 | 4,801 | 6,286 | 7,321 | 8,237 | 9,311 |
| 12, No Ligase | 4,381 | 6,886 | 7,717 | 9,066 | 11,059 | 17,825 |
| 13, No Primers | 3,960 | 4,947 | 7,070 | 8,123 | 11,707 | 19,439 |
| 14, No Template | 7,666 | 11,996 | 13,893 | 15,318 | 18,555 | 24,810 |
| 15, No Taq | 3,203 | 4,750 | 6,873 | 8,270 | 14,850 | 43,001 |
| 16 All Reagents | 4,472 | 6,293 | 11,178 | 29,312 | 96,211 | 165,876 |

Numbers are arbitrary fluorescence units (AU)

A2 is in bold font, A1 is in standard font.

Reaction Condition Composition

| Tube | A1 | A2 | DNA added | Conditions |
|------|-----|------|-----------|------------|
| 1 | 668 | 1734 | 5ng | Patent |
| 2 | 356 | 1028 | 10ng | Patent |
| 3 | 780 | 2286 | 20ng | Patent |
| 4 | 739 | 2293 | 1ug | Patent |

Tubes 1-4 are with 5ng, 10ng, 20ng, 1ug of sample DNA, respectively

Standard Method

| Tube | A1 | A2 | DNA added | Conditions |
|------|----|----|-----------|------------|
| 1 | 13 | 38 | 5ng | Standard |
| 2 | 36 | 61 | 10ng | Standard |
| 3 | 41 | 75 | 20ng | Standard |
| 4 | 54 | 93 | 1ug | Standard |

There was no increase in fluorescence even with 1 ug of DNA

A2 is in bold font, A1 is in standard font.

DNA Ligase

| Tube | A1 | A2 | Ligase Added |
|---|---|---|---|
| 1 | 795 | 2007 | 5 units |
| 2 | 811 | 2104 | 5 units |
| 3 | 243 | 756 | 1 unit |
| 4 | 569 | 1624 | 1 unit |

A2 is in bold font, A1 is in standard font

Taq DNA Polymerase

| Tube | A1 | A2 | Taq Added |
|---|---|---|---|
| 5 | 444 | 1456 | 2.5 units |
| 6 | 603 | 1707 | 2.5 units |
| 7 | 1262 | 2640 | 0.2 units |
| 8 | 1378 | 2688 | 0.2 units |

A2 is in bold font, A1 is in standard font

Circularizing Oligonucleotide Probes (COP)

| Tube | A1 | A2 | Final COP Concentration |
|------|------|------|------|
| 1 | 1247 | 2642 | 0.0125 μM |
| 2 | 1305 | 2769 | 0.0125 μM |
| 3 | 1467 | 2642 | 0.0125 μM |
| 4 | 768 | 2330 | 0.3000 μM |
| 5 | 627 | 1943 | 0.3000 μM |
| 6 | 760 | 2280 | 0.3000 μM |

A2 is in bold font, A1 is in standard font.

NAD+

| Tube | A1 | A2 | Final NAD+ concentration |
|---|---|---|---|
| 1 | 346 | 1647 | 0.1 mM |
| 2 | 433 | 1929 | 0.1 mM |
| 3 | 393 | 1754 | 0.1 mM |
| 4 | 584 | 2389 | 1.5 mM |
| 5 | 624 | 2287 | 1.5 mM |
| 6 | 623 | 2586 | 1.5 mM |

A2 is in bold font, A1 is in standard font.

MgCl₂ Range

| Tube | A1 | A2 | Final MgCl₂ Concentration |
|---|---|---|---|
| 1 | 199 | 1055 | 1.5 mM |
| 2 | 252 | 1244 | 1.5 mM |
| 3 | 311 | 1477 | 1.5 mM |
| 4 | 338 | 1180 | 4.0 mM |
| 5 | 362 | 1216 | 4.0 mM |
| 6 | 276 | 915 | 4.0 mM |

A2 is in bold font, A1 is in standard font.

Tris-HCL buffer

| Tube | A1 | A2 | Final Tris-HCl Concentration |
| --- | --- | --- | --- |
| 1 | 140 | 967 | 10 mM |
| 2 | 248 | 1241 | 10 mM |
| 3 | 205 | 975 | 10 mM |
| 4 | 298 | 1262 | 15 mM |
| 5 | 314 | 1220 | 15 mM |
| 6 | 315 | 1212 | 15 mM |

A2 is in bold font, A1 is in standard font.

| Tube | A1 (AU) | A2 (AU) | DNA added | Conditions |
|------|---------|---------|-----------|------------|
| 1 | 668 | 1734 | 5ng | RCC |
| 2 | 356 | 1028 | 10ng | RCC |
| 3 | 780 | 2286 | 20ng | RCC |
| 4 | 739 | 2293 | 1ug | RCC |
| 5 | 32 | 54 | 5ng | No Primers/ DNA Polymerase |
| 6 | 20 | 28 | 10ng | No Primers/ DNA Polymerase |
| 7 | 14 | 28 | 20ng | No Primers/ DNA Polymerase |
| 8 | 61 | 107 | 1ug | No Primers/ DNA Polymerase |

REACTION CONDITION COMPOSITION FOR CIRCULARIZING OLIGONUCLEOTIDE PROBES

REFERENCE TO RELATED APPLICATIONS

This application is national stage entry under 35 U.S.C. § 371(f) of PCT/US19/13222 entitled "REACTION CONDITION COMPOSITION FOR CIRCULARIZING OLIGONUCLEOTIDE PROBES" filed Jan. 11, 2019, which claims the benefit of priority to U.S. Provisional Patent Application No. 62/616,866 filed Jan. 12, 2018, entitled "REACTION CONDITION COMPOSITION FOR CIRCULARIZING OLIGONUCLEOTIDE PROBES", which are both incorporated by reference in their entirety.

BACKGROUND

Circularizing oligonucleotide probes (COPs) or padlock probes are conventionally used to detect specific deoxyribonucleic acid (DNA) sequences of interest, including single nucleotide polymorphisms (genomic variations). COPs are selected to hybridize and ligate (i.e. circularize) via DNA ligase to a specific DNA sequence containing a genomic variation (target sequence), however using conventional biochemical reaction techniques for ligation not all COPs circularize. Therefore detection of the specific DNA sequence is not efficient using COPs and a small sample volume (and amount) of the DNA sequence of interest.

Other conventional methods utilize rolling circle amplification (RCA) to replicate just the hybridized and ligated COP (referred to as circularized probe or CP) for amplification of the fluorescent signal when detecting the genomic variation using fluorescent primers. In this conventional method of RCA, amplification is accomplished using DNA polymerases that work under isothermal conditions. Overall, genomic variation detection utilizing COP conventionally requires two steps: 1. The hybridization and ligation of COPs bound to the target sequence; and 2. amplification of circularized probes via RCA using isothermal DNA polymerases.

A conventional COP format is illustrated in FIG. 1. Conventional COPs are typically about 80 to 120 base pairs long and are synthesized as a single stranded linear piece of DNA in the typical 5' to 3' orientation except that they have a 5'-P (phosphate group). The 3' end is always the —OH group from the last base of the COP and can now ligate to the 5'-end phosphate (P) in the presence of DNA ligase. The thick black line indicated as 16 represents the 3' beginning of the COP and the 5' end of the COP. The 3' beginning and the 5' end part are usually a contiguous sequence (once ligated), which is complimentary to the target sequence being detected by the COP. The sequence indicated with a clear line as 15 is the backbone sequence. The backbone sequence is specific to a COP and is constant. The sequence indicated as 16 can be changed for any desired target sequence. The backbone sequence 15 contains primer binding sites that will allow a primer to anneal and prime DNA synthesis from a COP or a CP allowing the single stranded CP or COP to be double stranded. COP primers may be fluorescently labeled allowing detection of circularized probes (CPs) through amplification such as RCA.

Conventional methods using COPs and RCA with CP fluorescence detection allow SNP genotyping from many organisms. While this conventional technology both identifies the target sequence and allows for SNP detection in a single, two step method, its limitations include the need for large amounts of target DNA, and the need for cleanup procedures between the ligation and amplification steps to eliminate background noise of non-ligated COPs.

In order to utilize COP and RCA on small sample volumes (amount), some conventional methods first amplify the DNA sample such as through polymerase chain reaction (PCR). The amplified sample is then subject to COP and RCA methods for genomic variation detection. However, this conventional method of sample amplification prior to COP and RCA methods is not preferable as it requires two amplification steps (e.g. PCR and RCA), which is time consuming and expensive.

It is therefore desirable for a reaction condition composition and method to detect genomic variations on a small amount of sample DNA that does not require a first separate step of amplification of the DNA. It is further desirable to have a method that does not require the elimination of background noise (non-ligated COPs) prior to amplification of the CPs.

SUMMARY

In one aspect of the invention a reaction condition composition for hybridization and ligation of circularizing oligonucleotide probes includes a DNA ligase from 1 to 5 units; a DNA polymerase from 0.2 to 2.5 units; at least one circularizing oligonucleotide probe having a final concentration from 0.0125 to 0.3 micromolar, wherein the at least one circularizing oligonucleotide probe is specific to a first genomic variation; a deoxyribonucleic acid buffer capable of maintaining a pH from 7 to 9; NAD+ having a final concentration from 0.1 to 1.4 millimolar; at least two primers having a final concentration from 0.1 to 0.5 micromolar, wherein the at least two primers are specific to a first replication sequence; and deoxynucleotide triphosphates having a final contraction from 0.1 to 0.2 millimolar.

In another aspect of the invention a reaction condition composition a method for hybridization and ligation of circularizing oligonucleotide probes for detection of a genomic target includes contacting a reaction condition composition with a DNA sample having the genomic target, where the reaction condition composition comprises at least one circularizing oligonucleotide probe specific to the genomic variation; hybridizing the circularizing oligonucleotide probe to the genomic variation, wherein the hybridizing includes heating the sample contacted with the reaction condition composition from 90 to 95 degrees Celsius; ligating the hybridized circularized circularizing oligonucleotide probe to form a circularized probe, wherein the ligating includes cyclical heating and cooling of the reaction condition composition contacted sample; replicating the circularized probe for detection; detecting the circularized probe to identify the genomic variation.

In another aspect of the invention a reaction condition composition kit includes a tube; a dehydrated reaction condition composition, wherein the dehydrated reaction condition composition is contained in the tube; a rehydration buffer container; a rehydration buffer, wherein the rehydration buffer is contained in the rehydration buffer container; instructions configured for performing a reaction condition composition method; and a container configured to contain, the tube, the rehydration buffer container, and the instructions.

FIGURES

DETAILED DESCRIPTION

Reaction condition compositions for detecting a genomic variation from a small sample amount from 5 nano grams (ng) to 1 microgram (ug) includes DNA ligase, DNA polymerase, at least one COP, a DNA polymerase buffer, NAD+, at least two primers, and deoxynucleotide triphosphates (dNTPs). Detection of the genomic variation utilizes COPs with increased ligation efficiency and RCA with fluorescence detection due to simultaneous ligation of COPs to CPs and replication of the genomic variation. The reaction condition composition eliminates the need to perform background reduction of un-hybridized or un-ligated COPs.

Figure 1:
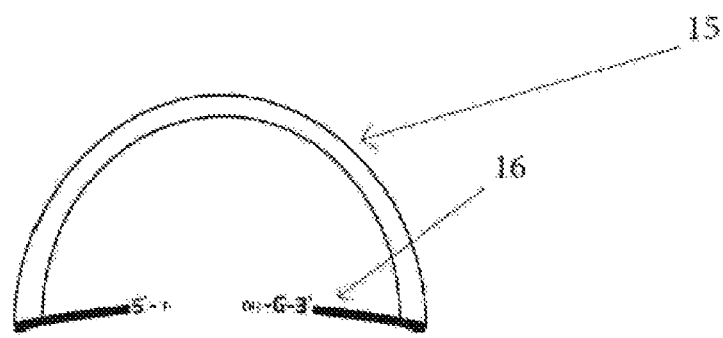
FIG. 1 represents an illustrative example of a conventional circularizing oligonucleotide probe.
Figure 2:
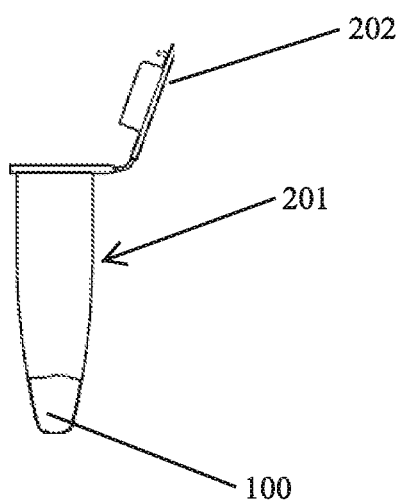
FIG. 2 represents a reaction condition composition tube.

FIG. 2 represents a reaction condition composition tube. The reaction condition composition tube 200 includes a tube 201 and a reaction condition composition 100. The reaction condition composition tube 200 may include a lid 202. The tube 201 of the reaction condition composition tube 200 may be a tube of any size configured for holding liquids that is compatible with the reaction condition composition 100. The tube 201 may be made of a non-reactive material, such as glass, plastic, metal, polypropylene or ceramic.

The lid 202 of the stabilizing composition tube 200 is a lid configured for placement on the tube 201 to seal the tube 201 to keep liquid in the tube 201 when inverted and to keep contaminants that are airborne or the like out of the tube 201. The lid 202 may be of a non-reactive material including plastic, rubber, Teflon, metal, and combinations thereof.

The reaction condition composition 100 of the reaction condition composition tube includes a DNA ligase, DNA polymerase, at least one COP, a DNA polymerase buffer, β-Nicotinamide adenine dinucleotide (NAD+), at least two primers, and deoxynucleotide triphosphates (dNTPs).

The DNA ligase of the reaction condition composition 100 is thermostable (i.e. active during thermal cycles alternating between up to 100 degrees Celsius to 55 degrees Celsius over at least an hour). The DNA ligase is also NAD+ dependent. The preferred DNA ligase is Ampligase supplied by Lucigen. The reaction condition composition 100 may include from 1 to 5 units of DNA ligase. Preferably the reaction condition composition 100 includes 1.5 to 3.5 units of DNA ligase. Most preferably the reaction condition composition 100 includes 2 to 3 units of DNA ligase. When referring to units of DNA ligase, the standard definition of one unit is equal to the amount of DNA ligase required to convert 1 nano mole of $^{32}P$-labeled inorganic pyrophosphate into Norit adsorbable material in 20 minutes at 37 degrees Celsius. Other comparable and industry accepted definitions of DNA ligase activity may also be suitable. DNA ligase may be used in any concentration of unit per microliter (ul), but preferably is 5 Units/microliter.

The DNA polymerase of the reaction condition composition is thermostable. The preferred DNA polymerase is Taq polymerase. The reaction condition composition 100 may include from 0.2 to 2.5 units of DNA polymerase. Preferably, the reaction condition composition 100 may include from 0.25 to 1.5 units of DNA polymerase. Most preferably, the reaction condition composition 100 may include from 0.3 to 1.0 units of DNA polymerase. When referring to units of DNA polymerase 1 unit of DNA polymerase is equal to the amount of DNA polymerase that incorporates 15 nano moles of dNTP into acid insoluble material in 30 minutes at 75 degrees Celsius. DNA polymerase may be used in any concentration of unit per volume, but preferably is 5 Units/microliter.

The reaction condition composition 100 includes at least one COP. Preferably the reaction condition composition 100 includes two COPs. The at least one COP hybridizes to the target sequence of the DNA sample and ligates at the genomic variation to form a CP during the reaction condition composition method. The COP further facilitates RCA for detection of the genomic variation. The COP (when ligated to a CP) of the reaction condition composition is from 0.0125 micromolar (μM) to 0.3 μM, final concentration.

The reaction condition composition 100 includes a DNA polymerase buffer capable of maintaining a pH of the reaction condition composition to promote replication of the genomic variation and RCA. The buffer system is basic and capable of maintaining a pH from 7 to 9, and is chosen from the group consisting of Tris-hydrochloride (Tris-HCl), potassium chloride (KCl), and magnesium chloride ($MgCl_2$). Preferably, the DNA polymerase buffer includes 10 to 50 millimolar (mM) Tris-HCl, 50 to 60 mM KCl, and 1.5 to 4 mM $MgCl_2$, final concentration. Preferably the Tris-HCl used is Tris-HCl with having a pH of 8.3.

The reaction condition composition 100 includes NAD+ to promote the DNA ligase to ligate the COP to the genomic variation forming CP. NAD+ may be from 0.1 to 1.4 mM, final concentration.

The reaction condition composition 100 includes at least two primers to prime the replications of the genomic variation. The primers are selected to anneal to a replication sequence on the 5' and 3' side of the genomic variation to allow for polymerization and replication of the target sequence (see FIG. 3). For example, as a genomic variation will have two complimentary base pairs, the at least two primers will be selected as complimentary to the strand of DNA containing the genomic variation to replicate. The at least two primers replicate the target sequence, including the genomic variation, under non-conventional PCR cycling conditions, and instead under the cycling conditions of the reaction condition composition method of FIG. 4. The at least two primers may be from 18 to 50 nucleotides in length. The at least two primers are from 0.1 to 0.5 µM, final concentration. The target sequence amplified by the at least two primers may be from 50 to 500 base pairs in length.

The reaction condition composition 100 includes deoxynucleotide triphosphates (dNTP) to facilitate ligation of the COP to form a CP, replication of the CP via RCA, and replication of the genomic variation. The dNTP may be from 0.1 to 0.2 mM, final concentration.

Figure 3:
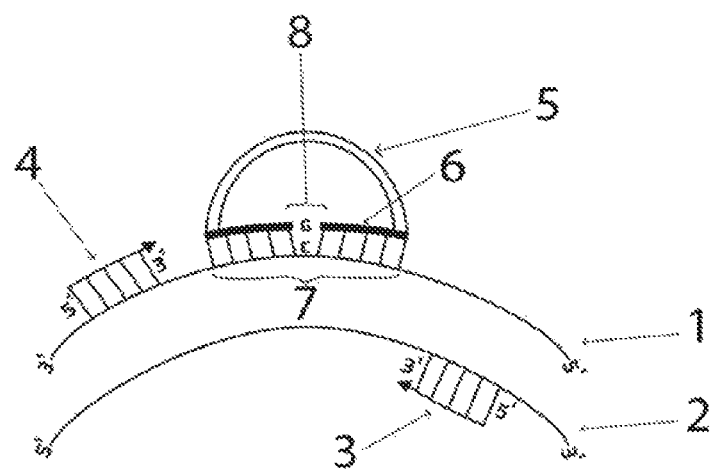
FIG. 3 represents an illustration of ligation of COPs to CP and replication of the genomic variation by priming at the target sequences.

FIG. 3 represents step 406 of the reaction condition composition method to illustrate the ligation of COPs to CP and replication of the genomic variation by priming at the target sequences. The DNA sample is represented by 1 and 2 where each shows a single strand of the double stranded DNA sample. The genomic variation is represented by 8, and in this example the genomic variation is a SNP for cytosine. The target sequence containing the genomic variation is represented by 7. The COP is represented by 5 and 6, where 5 represents the backbone of the COP and 6 represents the portion of the COP that is complimentary to the target sequence. Ligation is represented by 8 where the COP forms a CP when guanine at the 3' end of the COP bonds to cytosine on the genomic DNA sample and is ligated. Simultaneously, the at least two primers, represented by 3 and 4 bind to the replication sequence to prime the replication of the target sequence.

Figure 4:
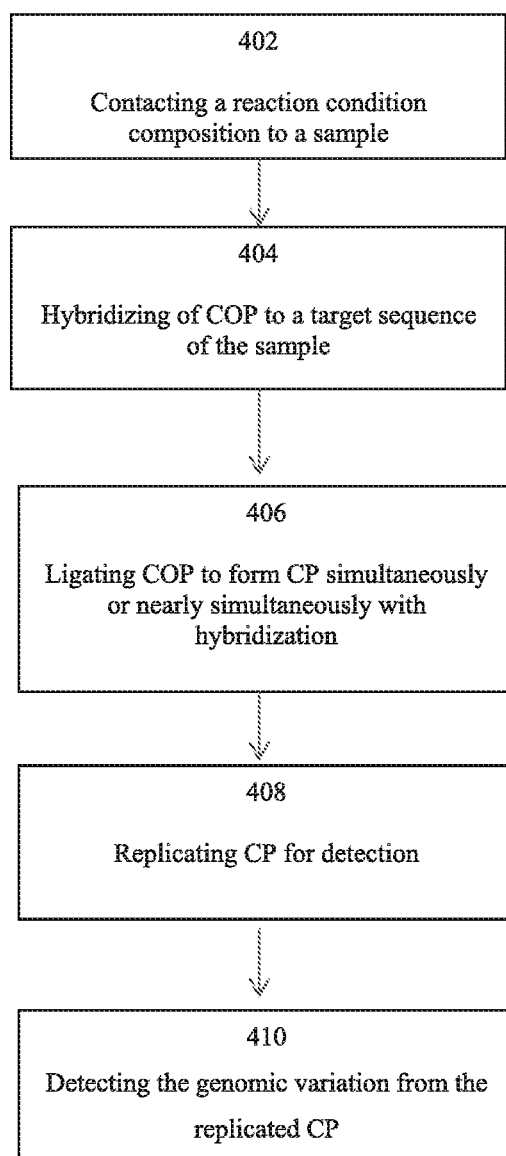
FIG. 4 represents a reaction condition composition method.

FIG. 4 illustrates a reaction condition composition method 400 for detecting genomic variations in a DNA sample with the reaction condition composition. The DNA sample includes a genomic variation for detection. The reaction condition composition and method increases efficiency of ligation of COPs (ratio of ligated COPs for formation of CP to un-hybridized and un-ligated COPs) for increased efficiency of detection the genomic variation. In step 402, the sample is contacted with the reaction condition composition. The contacting may include pipetting the sample into a reaction condition composition tube.

In step 404, the COPs of the reaction condition composition are hybridized to the target sequence (including the genomic variation) in the DNA sample. The hybridizing includes incubating the sample contacted with the reaction condition composition to approximately 95 degrees Celsius for approximately 5 minutes to denature the sample (e.g. denature the double stranded DNA to single stranded DNA). The hybridizing further includes the at least one COPs binding to the target sequence in the DNA sample.

In step 406, the bound COPs are ligated to form CPs simultaneously or nearly simultaneously to hybridization. The ligation includes cyclical heating and cooling of the reaction condition composition contacted DNA sample configured to increase efficiency of ligation of COPs to CPs for increased efficiency of detection. The cyclical heating and cooling may be from 3 to 40 cycles, where a cycle is equal to one heating and cooling round. For example, the cyclical heating and cooling may be 30 cycles of heating and cooling that includes heating to approximately 95 degrees Celsius for approximately 30 seconds and cooling to 60 degrees Celsius for approximately 45 seconds. The ligation further includes priming the replication sequence for replication of the target sequence through the at least two primers annealing to the replication sequence. The ligation further includes replication of the target sequence.

In step 408, the CP are replicated for detection. The replication may include replication by rolling circle amplification (RCA) using conventional methods, or other conventional replication methods. The increased efficiency of the COP ligation in step 406 eliminates the need for an additional step of reducing background (e.g. un-hybridized or un-ligated COPs), such as by exonucleases.

In step 410, the genomic variation is detected from the replicated CP. Detection may be through fluorescent labeled primers specific to the CPs, such as through detection of signal intensity (AU) over time of step 408 (e.g. measuring signal intensity as replication of the CP occurs). Detection of signal intensity above a threshold level (e.g. above background fluorescence) demonstrates the fluorescent primers have bound to CPs indicating the presence of the genomic variation.

Figure 5:
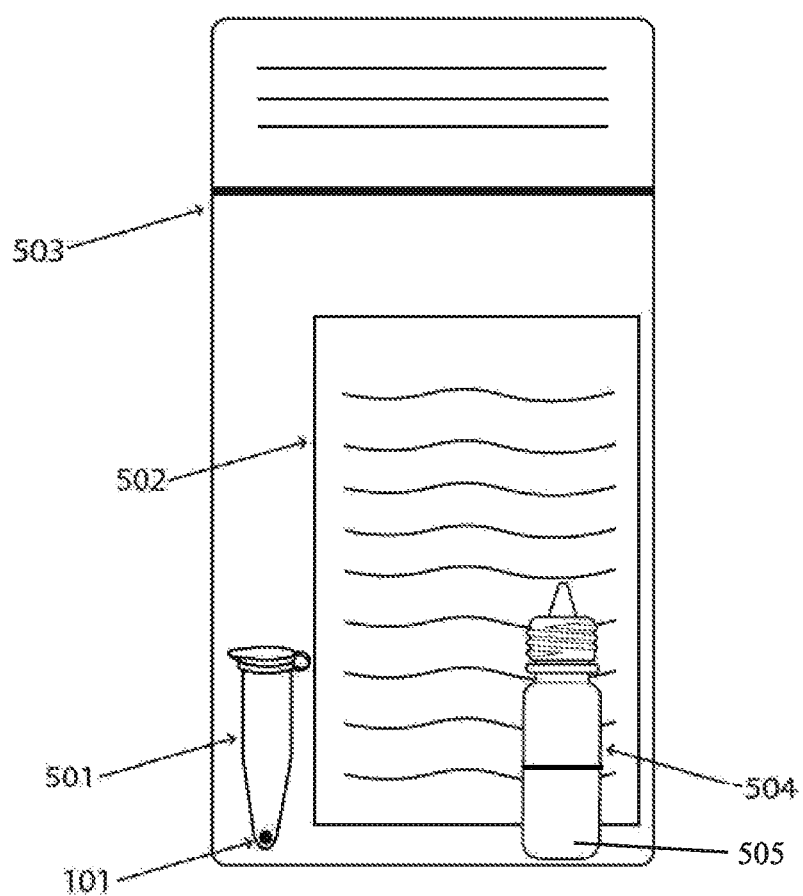
FIG. 5 represents a reaction condition composition kit.

FIG. 5 represents a reaction condition composition kit 500. The reaction condition composition may be used as part of the reaction condition composition kit 500, which may be used in the field close to the source of a sample (e.g. cattle, swine, poultry, or humans) or in a laboratory. The reaction condition composition kit includes a dehydrated reaction condition composition 101 provided in a tube 501, and instructions 502. Preferably the reaction condition composition kit includes a container 503, at least one re-hydration buffer container 504, and at least one rehydration buffer 505.

The tube 501 contains the dehydrated reaction condition composition 101. The dehydrated reaction condition composition is the reaction condition composition in dehydrated form. The tube 501 includes a mass of dehydrated reaction condition composition 101, for example, to perform up to 8 reactions once rehydrated. The tube 501 is made of a non-reactive material, such as glass, plastic, metal, polypropylene or ceramic. The tube is configured to hold liquids when inverted, such as by a cap, rubber stopper, screw cap, or dropper tube. The kit 500 may have one tube 501 to perform one reaction. The kit 500 may have eight tubes 501 with dehydrated reaction condition composition to perform a single reaction in each tube. The kit 500 may contain one tube 501 with dehydrated reaction condition composition to perform at least 1000 reactions.

The instructions 502 detail the reaction condition composition method. Preferably, the instructions detail the method 400 as described in FIG. 4. The instruction may further detail how the dehydrated reaction condition composition 101 may be rehydrated using the rehydration buffer 505 to yield a proper volume of reaction condition composition to perform the method 400.

The at least one bottle 504 is configured to hold liquids, in particular a re-hydration buffer 505. The at least one bottle 504 is made of a non-reactive material, such as glass, plastic, metal, polypropylene or ceramic. The at least one bottle 504 may further be configured to hold liquids when inverted, such as through a cap, lid, or rubber stopper.

The rehydration buffer 505 of the bottle 504 may be sterile water that is able to rehydrate the reaction condition composition according to the instructions 502.

The container 503 is configured to contain the bottle 504, the reaction tube 501 and the instructions 502. The container 503 may further be configured to hold the at least one bottle 504. The container 503 may be configured to hold multiple tubes 501 and 504. The container 504 may be of any non-reactive material, such as cardboard, plastic, or polystyrene. The container 504 may be of any geometric shape configured for the holding the contents of the kit, such as a cuboid, cylinder, or triangular prism.

EXAMPLES

Figure 6:
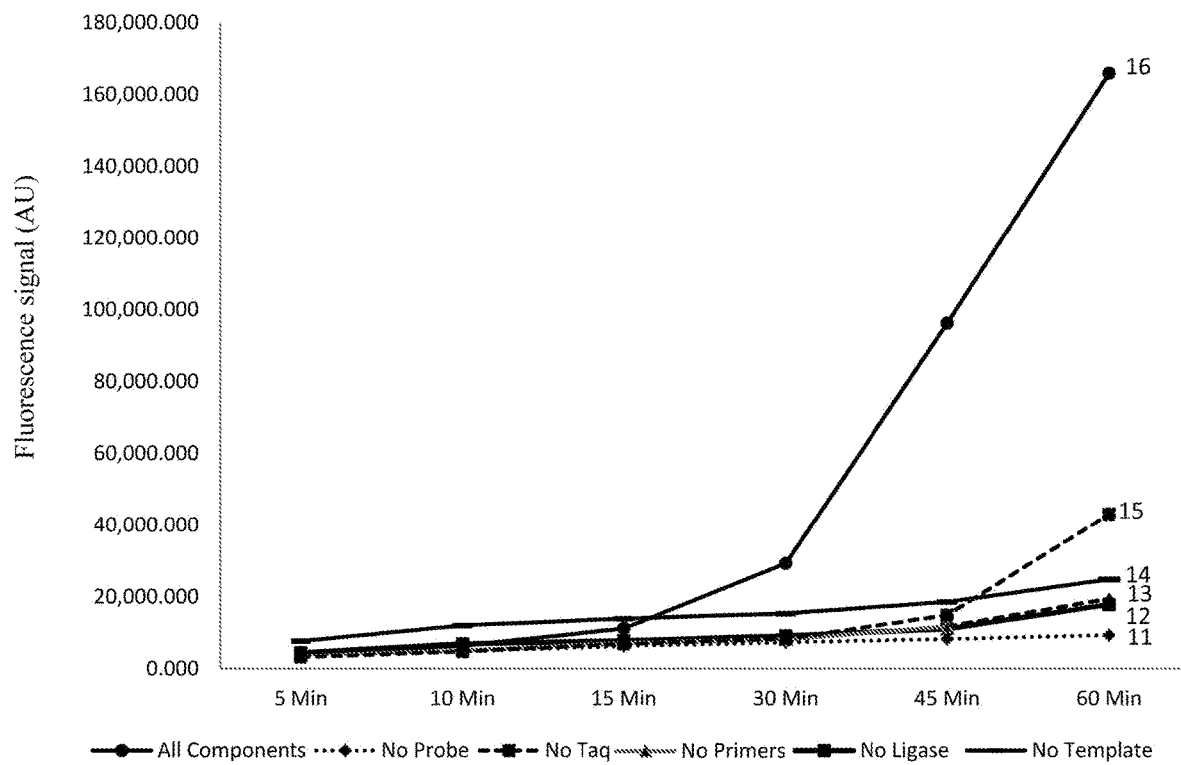
FIG. 6 is an example of detection of a genomic variation using a reaction condition composition and method as compared to compositions without all of the components of the reaction condition composition.

FIG. 6 represents detection of a genomic variation using a reaction condition composition and method as compared to compositions without all of the components of the reaction condition composition. This example detects the presence of a genomic variation of the beta casein gene in bovine using a fluorescent primer DY636 (absorption at 645 nanometers and emission at 671 nanometers) and fluorescent detection using an (ABI Quantstudio Model 5) measured over time during replication of the CP.

With respect to the reaction condition composition identified as 16 in FIG. 6, the reaction condition composition included 2.5 units of DNA ligase (Ampligase), 0.4 units of DNA Polymerase (Taq Polymerase), 0.1 μM of COP having a sequence complimentary to the target sequence of the beta casein bovine gene, DNA polymerase buffer of 10 mM Tris-HCl (pH 8.3), 50 mM KCl, 1.5 mM MgCl2, 0.25 mM NAD+, 0.1 mM of dNTP mix, and 0.25 μM each of two primers specific (complimentary) to the replication sequence of the sample DNA. The reaction condition composition was contacted with 1 μL of a DNA sample of bovine genomic DNA (5 to 10 nano grams), and the foregoing concentrations represent final concentrations of the reaction condition composition and DNA sample. While a specific reaction condition composition was used in this instance, other reaction condition compositions may be used.

With respect to the No Probe composition identified as 11 in FIG. 6, the composition included 2.5 units of DNA ligase (Ampligase), 0.4 units of DNA Polymerase (Taq Polymerase), DNA polymerase buffer of 10 mM Tris-HCl (pH8.3), 50 mM KCl, 1.5 mM MgCl2, 0.25 mM NAD+, 0.1 mM of dNTP mix, and 0.25 μM each of two primers specific (complimentary) to the replication sequence of the sample DNA. The No Probe composition was contacted with the DNA sample of bovine genomic DNA (5 to 10 nano grams), and the foregoing concentrations represent final concentrations of the reaction condition composition and DNA sample.

With respect to the No Ligase composition identified as 12 in FIG. 6, the composition included 0.4 units of DNA Polymerase (Taq Polymerase), 0.1 μM of COP having a sequence complimentary to the target sequence of the beta casein bovine gene, DNA polymerase buffer of 10 mM Tris-HCl (pH 8.3), 50 mM KCl, 1.5 mM MgCl2, 0.25 mM NAD+, 0.1 mM of dNTP mix, and 0.25 μM each of two primers specific (complimentary) to the replication sequence of the sample DNA. The No Ligase composition was contacted with DNA sample of bovine genomic DNA (5 to 10 nano grams), and the foregoing concentrations represent final concentrations of the reaction condition composition and DNA sample.

With respect to the No Primers composition identified as 13 in FIG. 3, the composition included 2.5 units of DNA ligase (ampligase), 0.4 units of DNA Polymerase (Taq Polymerase), 0.1 μM of COP having a sequence complimentary to the target sequence of the beta casein bovine gene, DNA polymerase buffer of 10 mM Tris-HCl (pH8.3), 50 mM KCl, 1.5 mM MgCl2, 0.25 mM NAD+, and 0.1 mM of dNTP mix. The No Primers composition was contacted with the DNA sample of bovine genomic DNA (5 to 10 nano grams), and the foregoing concentrations represent final concentrations of the reaction condition composition and DNA sample.

With respect to the No Template composition identified as 14 in FIG. 6, the composition included 2.5 units of DNA ligase (ampligase), 0.4 units of DNA Polymerase (Taq Polymerase), 0.1 μM of COP having a sequence complimentary to the target sequence of the beta casein bovine gene, DNA polymerase buffer of 10 mM Tris-HCl (pH8.3), 50 mM KCl, 1.5 mM MgCl2, 0.25 mM NAD+, 0.1 mM of dNTP mix and 0.25 μM each of two primers specific (complimentary) to the replication sequence of the sample DNA. The No Template composition was not contacted with the DNA sample of bovine genomic DNA (5 to 10 nano grams), and the foregoing concentrations represent final concentrations of the reaction condition composition and DNA sample.

With respect to the No Taq Composition identified as 15 in FIG. 6, the composition included 2.5 units of DNA ligase (ampligase), 0.1 μM of COP having a sequence complimentary to the target sequence of the beta casein bovine gene, DNA polymerase buffer of 10 mM Tris-HCl (pH8.3), 50 mM KCl, 1.5 mM MgCl2, 0.25 mM NAD+, 0.1 mM of dNTP mix, and 0.25 μM each of two primers specific (complimentary) to the replication sequence of the sample DNA. The No Taq composition was contacted with the DNA sample of bovine genomic DNA (5 to 10 nano grams), and the foregoing concentrations represent final concentrations of the reaction condition composition and DNA sample.

After contacting the foregoing compositions to the DNA sample, the remainder of the reaction condition method is carried out. In particular, for each DNA sample contacted with a respective composition, the contacted DNA samples are incubated at 95 degrees Celsius for 5 minutes. This is followed by 30 cycles of heating and cooling to 95 degrees Celsius for 30 seconds and 60 degrees Celsius for 45 seconds. Finally, replication of the CP was carried out via conventional RCA. Fluorescence was then measured as shown by lines corresponding to each composition as identified in the graph, where fluorescence is measure over time corresponding to the replication of the CP.

The graph of FIG. 6 and accompanying table demonstrates that the reaction condition composition yields the highest fluorescent detection indicating that the reaction condition composition and method efficiently ligate COPs to CP for accurate detection of the genomic variation without reduction of background COPs on a small sample amount.

Figure 7:
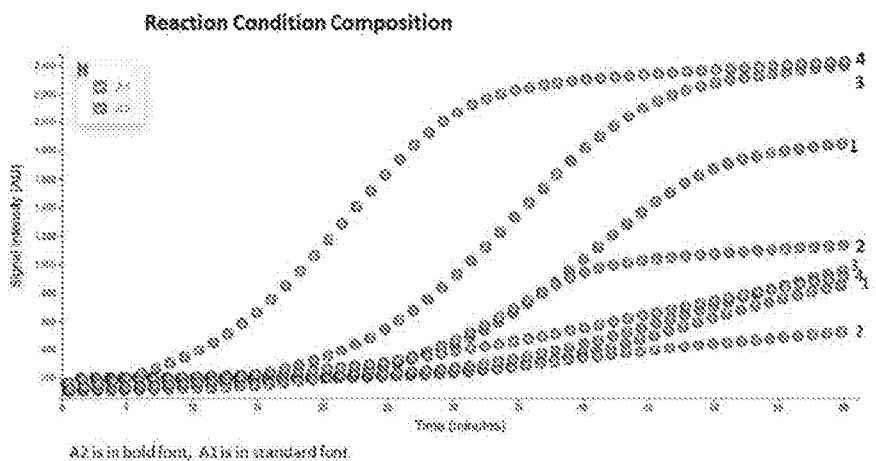
FIG. 7 is a comparative example of the reaction condition composition and method versus standard hybridization and ligation for detection of a genomic variation of small sample sizes.
Figure 7:
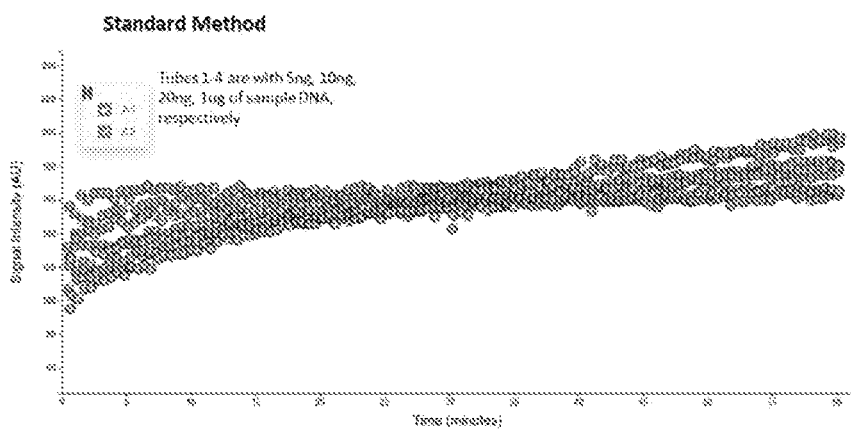

FIG. 7 is a comparative example of the reaction condition composition and method versus standard hybridization and ligation for detection of a genomic variation from small sample amounts. In this example genetic variations are detected on the bovine beta casein gene, represented by A1 and A2. The genetic variations of the beta case gene are from a heterozygous sample, such that the A1 and A2 alleles will be detected. FIG. 7 includes a legend identifying A1 and A2. In this example, the A2 allele provides a stronger signal than the A1 allele but both are detected if the reaction condition composition and method work as described herein.

Referring to FIG. 7, the reaction condition composition of tubes labeled 1, 2, 3, and 4 included 5 units of DNA ligase (Ampligase), 0.8 units of DNA polymerase (Taq polymerase), 0.1 μM each of two COPs having a sequence complimentary to the target sequence of each allele of the beta casein SNP, DNA polymerase buffer of 10 mM Tris-HCl pH8.3, 50 mM KCl, 1.5 mM MgCl$_2$, 0.25 mM NAD+, 0.1 mM of dNTP mix, and 0.25 μM each of two primers specific (complimentary) to the replication sequence of the sample DNA. Tubes 1-4 of the reaction condition composition were contacted with 5 ng, 10 ng, 20 ng, 1 ug of the heterozygous bovine DNA sample, respectively. All concentrations are final.

The standard composition of tubes labeled 1, 2, 3, and 4 included 2.5 units of DNA ligase (Ampligase), 0.1 µM of each of COPs having a sequence complimentary to the target sequence of each allele of the beta casein SNP, DNA polymerase buffer of 20 mM Tris-HCl, 25 mM KCl, 10 mM $MgCl_2$, 0.5 mM NAD+, and 0.01% (weight/volume) of Triton X-100. Tubes 1-4 of the standard composition were contacted with 5 ng, 10 ng, 20 ng, 1 ug of the heterozygous bovine DNA sample, respectively. All concentrations are final.

After contacting the reaction condition composition to the DNA samples, the remainder of the reaction condition method is carried out. In particular, for each DNA sample contacted with the foregoing compositions, the contacted DNA samples are incubated at 95 degrees Celsius for 5 minutes; This is followed by 30 cycles of heating and cooling to 95 degrees Celsius for 30 seconds and 60 degrees Celsius for 45 seconds. Finally, replication of the CP was carried out via conventional RCA. Fluorescence was then measured simultaneous to RCA as shown by lines corresponding to each composition as identified in FIG. 7.

After contacting the standard composition to the DNA samples, each DNA sample was incubated at 95 degrees Celsius for 3 minutes and then cooled to 60 degrees Celsius for 20 minutes, in accord with conventional protocols for ligation of COPs. Replication of the CP was carried out via conventional RCA. Fluorescence was then measured simultaneous to RCA as shown by lines corresponding to each composition as identified in FIG. 7.

The results show that under the reaction condition composition and method each allele, A1 and A2, is detected with sample amounts as small as 5 nano grams. This is as compared to the standard composition and method, which does not allow for detection of either allele A1 or A2 at sample amounts as large as 1 micro gram, as fluorescent activity of each sample did not vary in a significant manner over the course of CP replication via RCA, indicating the alleles are not detectable using the standard composition and method on small sample amounts.

Figure 8:
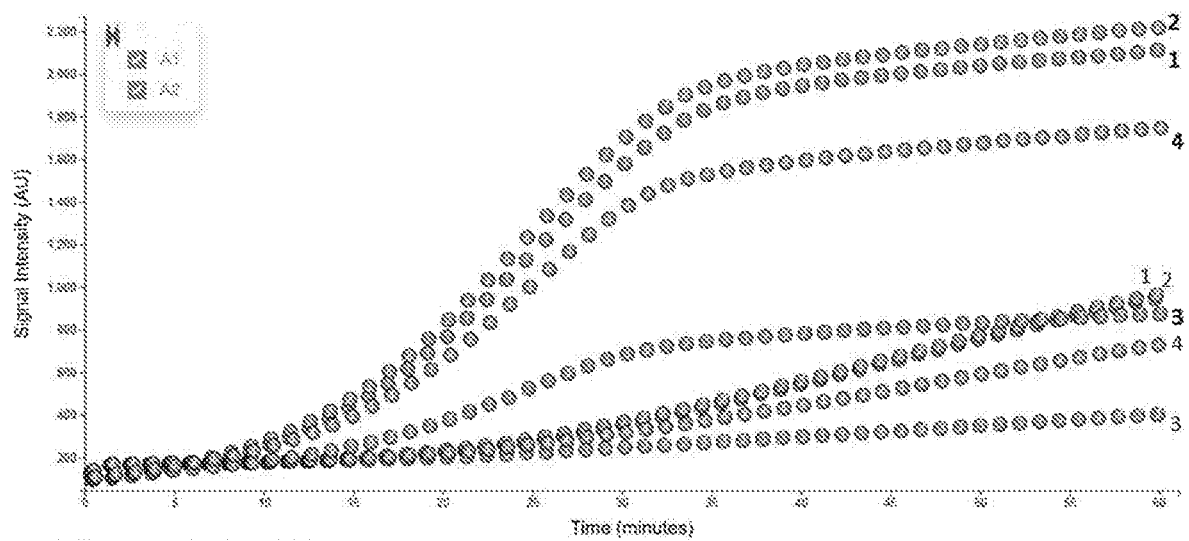
FIG. 8 is an example of the efficacy of the reaction condition composition with varying concentrations of DNA ligase.

FIG. 8 is an example of the efficacy of the reaction condition composition with varying concentrations of DNA ligase. In this example a genetic variations are detected on the beta casein bovine gene, represented by A1 and A2. The genetic variations of the beta case gene are from a heterozygous sample, such that the A1 and A2 alleles will be detected. FIG. 8 includes a legend identifying A1 and A2. In this example, the A2 allele yields stronger detection than the A1 allele but both are detected if the reaction works.

Referring to FIG. 8, the reaction condition composition of tubes labeled 1 and 2 included 5 units of DNA ligase (Ampligase), 0.8 units of DNA polymerase (Taq polymerase), 0.1 µM each of two COPs having a sequence complimentary to the target sequence of each allele of the beta casein SNP, DNA polymerase buffer of 10 mM Tris-HCl pH8.3, 50 mM KCl, 1.5 mM $MgCl_2$, 0.25 mM NAD+, 0.1 mM of dNTP mix, and 0.25 µM each of two primers specific (complimentary) to the replication sequence of the sample DNA. The reaction condition composition was contacted with 2 ul (10 ng) of sample DNA from the heterozygous bovine. All concentrations are final.

The reaction condition composition of tube labeled 3 and 4 included 1 unit of DNA ligase (Ampligase), 0.8 units of DNA polymerase (Taq polymerase), 0.1 µM each of two COPs having a sequence complimentary to the target sequence of each allele of the beta casein SNP, DNA polymerase buffer of 10 mM Tris-HCl pH 8.3, 50 mM KCl, 1.5 mM MgCl2, 0.25 mM NAD+, 0.1 mM of dNTP mix, and 0.25 µM each of two 2 primers specific (complimentary) to the replication sequence of the sample DNA. The reaction condition composition was contacted with 2 ul (10 ng) of sample DNA from the heterozygous animal. All concentrations are final.

After contacting the foregoing compositions to the DNA sample, the remainder of the reaction condition method is carried out. In particular, for each DNA sample contacted with the foregoing compositions, the contacted DNA samples are incubated at 95 degrees Celsius for 5 minutes. This is followed by 30 cycles of heating and cooling to 95 degrees Celsius for 30 seconds and 60 degrees Celsius for 45 seconds. Finally, replication of the CP was carried out via conventional RCA. Fluorescence was then measured simultaneous to RCA as shown by lines corresponding to each composition as identified in the graph, where fluorescence is measure over time corresponding to the replication of the CP.

FIG. 8 shows that reaction condition compositions including 5 units of DNA ligase and 1 unit of DNA ligase can detect SNPs on the bovine beta casein gene. This indicates that DNA ligase from 1 unit to 5 units in the reaction condition composition can detect genomic variations.

Figure 9:
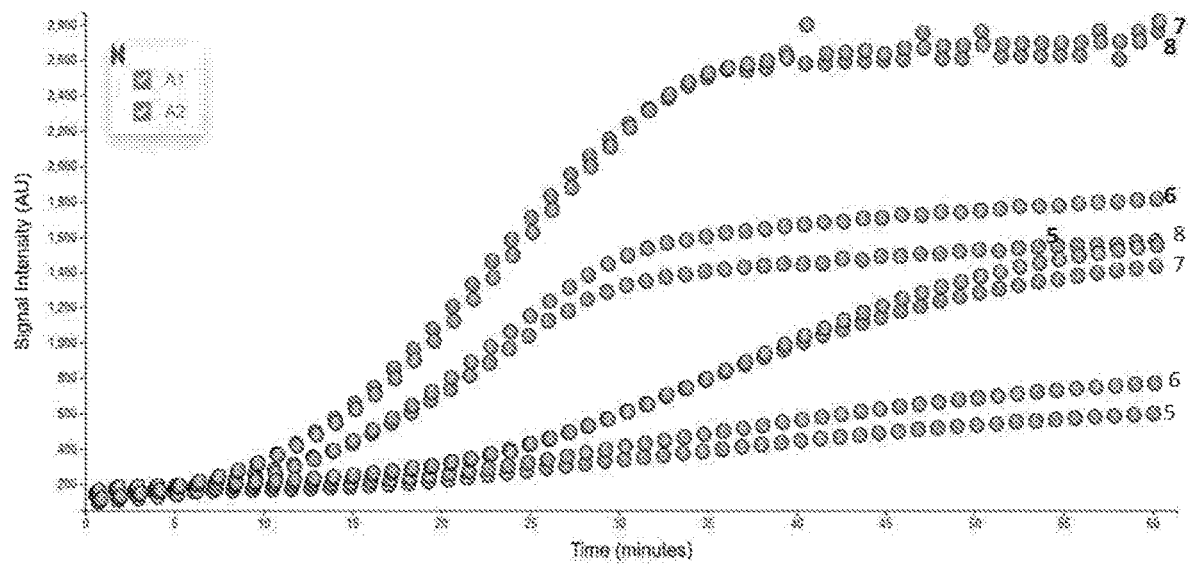
FIG. 9 is an example of the efficacy of the reaction condition composition with varying concentrations of DNA polymerase.

FIG. 9 is an example of the efficacy of the reaction condition composition with varying concentrations of DNA polymerase. In this example a genetic variations are detected on the beta casein bovine gene, represented by A1 and A2. The genetic variations of the beta case gene are from a heterozygous sample, such that the A1 and A2 alleles will be detected. FIG. 9 includes a legend identifying A1 and A2. In this example, the A2 allele yields stronger detection than the A1 allele but both are detected if the reaction works.

Referring to FIG. 9, the reaction condition composition of tubes labeled 5 and 6 included 5 units of DNA ligase (Ampligase), 2.5 units of DNA polymerase (Taq polymerase), 0.1 µM each of two COPs having a sequence complimentary to the target sequence of each allele of the beta casein SNP, DNA polymerase buffer of 10 mM Tris-HCl pH8.3, 50 mM KCl, 1.5 mM MgCl2, 0.25 mM NAD+, 0.1 mM of dNTP mix, and 0.25 µM each of two primers specific (complimentary) to the replication sequence of the sample DNA. The reaction condition composition was contacted with 2 ul (10 ng) of sample DNA from the heterozygous bovine. All concentrations are final.

The reaction condition composition of tube labeled 7 and 8 included 5 unit of DNA ligase (Ampligase), 0.2 units of DNA polymerase (Taq polymerase), 0.1 µM each of two COPs having a sequence complimentary to the target sequence of each allele of the beta casein SNP, DNA polymerase buffer of 10 mM Tris-HCl pH 8.3, 50 mM KCl, 1.5 mM MgCl2, 0.25 mM NAD+, 0.1 mM of dNTP mix, and 0.25 µM each of two 2 primers specific (complimentary) to the replication sequence of the sample DNA. The reaction condition composition was contacted with 2 ul (10 ng) of sample DNA from the heterozygous animal. All concentrations are final.

After contacting the foregoing compositions to the DNA sample, the remainder of the reaction condition method is carried out. In particular, for each DNA sample contacted with the foregoing compositions, the contacted DNA samples are incubated at 95 degrees Celsius for 5 minutes. This is followed by 30 cycles of heating and cooling to 95 degrees Celsius for 30 seconds and 60 degrees Celsius for 45 seconds. Finally, replication of the CP was carried out via conventional RCA. Fluorescence was then measured simultaneous to RCA as shown by lines corresponding to each composition as identified in the graph, where fluorescence is measure over time corresponding to the replication of the CP.

FIG. 9 shows that reaction condition compositions including 2.5 units of DNA polymerase and 0.2 units of DNA polymerase can detect SNPs on the bovine beta casein gene. This indicates that DNA polymerase from 0.2 to 2.5 units in the reaction condition composition can detect genomic variations.

Figure 10:
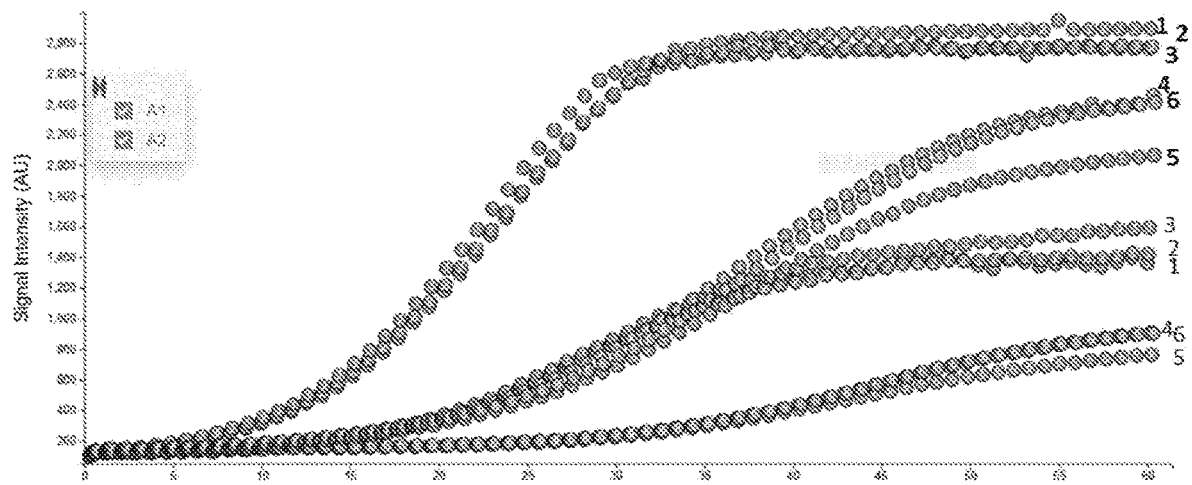
FIG. 10 is an example of the efficacy of the reaction condition composition with varying concentrations of COPs.

FIG. 10 is an example of the efficacy of the reaction condition composition with varying concentrations of COPs. In this example a genetic variations are detected on the beta casein bovine gene, represented by A1 and A2. The genetic variations of the beta case gene are from a heterozygous sample, such that the A1 and A2 alleles will be detected. FIG. 10 includes a legend identifying A1 and A2. In this example, the A2 allele yields stronger detection than the A1 allele but both are detected if the reaction works.

Referring to FIG. 10, the reaction condition composition of tubes labeled 1-3 included 5 units of DNA ligase (Ampligase), 0.8 units of DNA polymerase (Taq polymerase), 0.0125 µM each of two COPs having a sequence complimentary to the target sequence of each allele of the beta casein SNP, DNA polymerase buffer of 10 mM Tris-HCl pH8.3, 50 mM KCl, 1.5 mM MgCl2, 0.25 mM NAD+, 0.1 mM of dNTP mix, and 0.25 µM each of two primers specific (complimentary) to the replication sequence of the sample DNA. The reaction condition composition was contacted with 2 ul (10 ng) of sample DNA from the heterozygous bovine. All concentrations are final.

The reaction condition composition of tube labeled 4-6 included 5 units of DNA ligase (Ampligase), 0.8 units of DNA polymerase (Taq polymerase), 0.3000 µM each of two COPs having a sequence complimentary to the target sequence of each allele of the beta casein SNP, DNA polymerase buffer of 10 mM Tris-HCl pH 8.3, 50 mM KCl, 1.5 mM MgCl2, 0.25 mM NAD+, 0.1 mM of dNTP mix, and 0.25 µM each of two2 primers specific (complimentary) to the replication sequence of the sample DNA. The reaction condition composition was contacted with 2 ul (10 ng) of sample DNA from the heterozygous animal. All concentrations are final.

After contacting the foregoing compositions to the DNA sample, the remainder of the reaction condition method is carried out. In particular, for each DNA sample contacted with the foregoing compositions, the contacted DNA samples are incubated at 95 degrees Celsius for 5 minutes. This is followed by 30 cycles of heating and cooling to 95 degrees Celsius for 30 seconds and 60 degrees Celsius for 45 seconds. Finally, replication of the CP was carried out via conventional RCA. Fluorescence was then measured simultaneous to RCA as shown by lines corresponding to each composition as identified in the graph, where fluorescence is measure over time corresponding to the replication of the CP.

FIG. 10 shows that reaction condition compositions including 0.0125 µM of the COPs and 0.3000 µM of the COPs can detect SNPs on the bovine beta casein gene. This indicates that COPs from 0.0125 to 0.3000 µM in the reaction condition composition can detect genomic variations.

Figure 11:
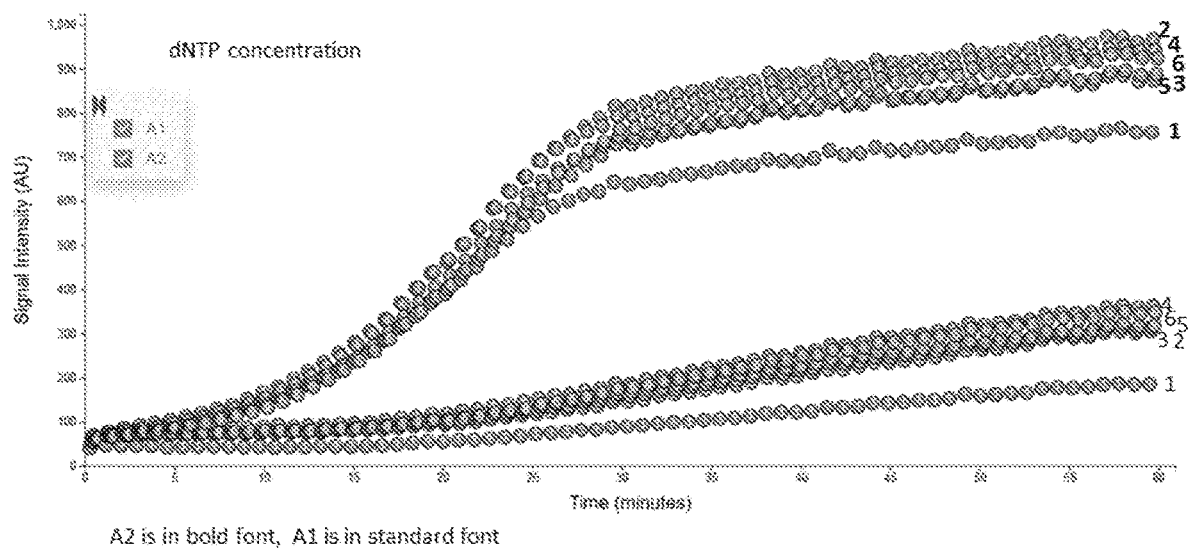
FIG. 11 is an example of the efficacy of the reaction condition composition with varying concentrations of dNTPs.

FIG. 11 is an example of the efficacy of the reaction condition composition with varying concentrations of dNTPs. In this example a genetic variations are detected on the beta casein bovine gene, represented by A1 and A2. The genetic variations of the beta case gene are from a heterozygous sample, such that the A1 and A2 alleles will be detected. FIG. 11 includes a legend identifying A1 and A2. In this example, the A2 allele yields stronger detection than the A1 allele but both are detected if the reaction works.

Referring to FIG. 11, the reaction condition composition of tubes labeled 1-3 included 5 units of DNA ligase (Ampligase), 0.8 units of DNA polymerase (Taq polymerase), 0.1 µM each of two COPs having a sequence complimentary to the target sequence of each allele of the beta casein SNP, DNA polymerase buffer of 10 mM Tris-HCl (pH 8.3), 50 mM KCl, 1.5 mM MgCl2, 0.25 mM NAD+, 0.1 mM of dNTP mix, and 0.25 µM each of two primers specific (complimentary) to the replication sequence of the sample DNA. The reaction condition composition was contacted with 2 ul (10 ng) of sample DNA from the heterozygous bovine. All concentrations are final.

The reaction condition composition of tube labeled 4-6 included 5 units of DNA ligase (Ampligase), 0.8 units of DNA polymerase (Taq polymerase), 0.1 µM each of two COPs having a sequence complimentary to the target sequence of each allele of the beta casein SNP, DNA polymerase buffer of 10 mM Tris-HCl pH 8.3, 50 mM KCl, 1.5 mM MgCl2, 0.25 mM NAD+, 0.2 mM of dNTP mix, and 0.25 µM each of two primers specific (complimentary) to the replication sequence of the sample DNA. The reaction condition composition was contacted with 2 ul (10 ng) of sample DNA from the heterozygous animal. All concentrations are final.

After contacting the foregoing compositions to the DNA sample, the remainder of the reaction condition method is carried out. In particular, for each DNA sample contacted with the foregoing compositions, the contacted DNA samples are incubated at 95 degrees Celsius for 5 minutes; this is followed by 30 cycles of heating and cooling to 95 degrees Celsius for 30 seconds and 60 degrees Celsius for 45 seconds. Finally, replication of the CP was carried out via conventional RCA. Fluorescence was then measured simultaneous to RCA as shown by lines corresponding to each composition as identified in the graph, where fluorescence is measure over time corresponding to the replication of the CP.

FIG. 11 shows that reaction condition compositions including 0.1 µM of the dNTPs and 0.2 µM of the dNTPs can detect SNPs on the bovine beta casein gene. This indicates that dNTPs from 0.1 to 0.2 µM in the reaction condition composition can detect genomic variations.

Figure 12:
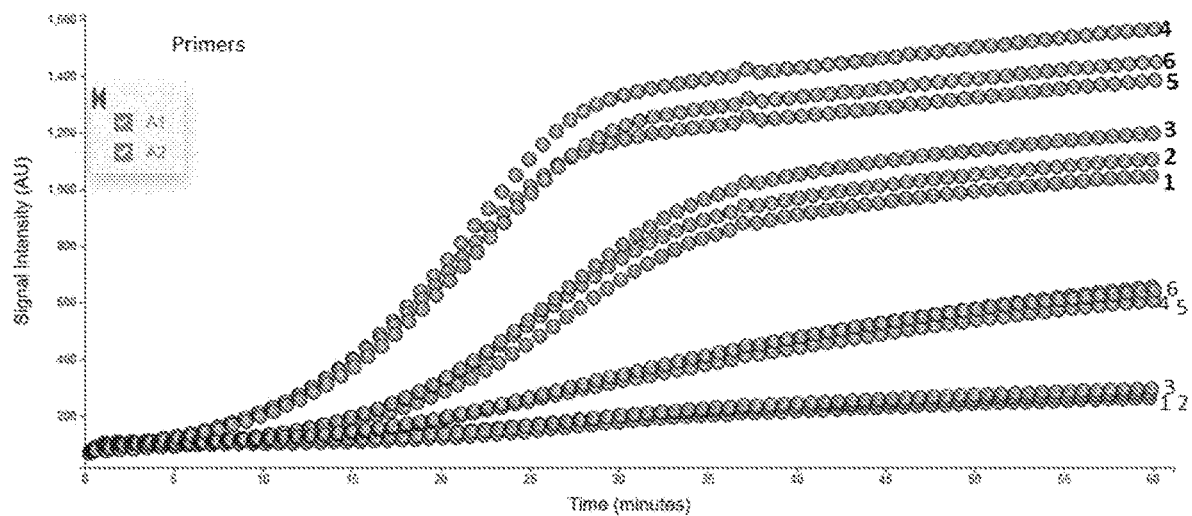
FIG. 12 is an example of the efficacy of the reaction condition composition with varying concentrations of the at least two primers.

FIG. 12 is an example of the efficacy of the reaction condition composition with varying concentrations of the at least two primers. In this example a genetic variations are detected on the beta casein bovine gene, represented by A1 and A2. The genetic variations of the beta case gene are from a heterozygous sample, such that the A1 and A2 allele will be detected. FIG. 12 includes a legend identifying A1 and A2. In this example, the A2 allele yields stronger detection than the A1 allele but both are detected if the reaction works.

Referring to FIG. 12, the reaction condition composition of tubes labeled 1-3 included 5 units of DNA ligase (Ampligase), 0.8 units of DNA polymerase (Taq polymerase), 0.1 µM each of two COPs having a sequence complimentary to the target sequence of each allele of the beta casein SNP, DNA polymerase buffer of 10 mM Tris-HCl (pH 8.3), 50 mM KCl, 1.5 mM MgCl$_2$, 0.25 mM NAD+, 0.1 mM of dNTP mix, and 0.1 µM each of two primers specific (complimentary) to the replication sequence of the sample DNA.

The reaction condition composition was contacted with 2 ul (10 ng) of sample DNA from the heterozygous bovine. All concentrations are final.

The reaction condition composition of tube labeled 4-6 included 5 units of DNA ligase (Ampligase), 0.8 units of DNA polymerase (Taq polymerase), 0.1000 µM each of two COPs having a sequence complimentary to the target sequence of each allele of the beta casein SNP, DNA polymerase buffer of 10 mM Tris-HCl pH 8.3, 50 mM KCl, 1.5 mM MgCl2, 0.25 mM NAD+, 0.1 mM of dNTP mix, and 0.5 µM each of two primers specific (complimentary) to the replication sequence of the sample DNA. The reaction condition composition was contacted with 2 ul (10 ng) of sample DNA from the heterozygous animal. All concentrations are final.

After contacting the foregoing compositions to the DNA sample, the remainder of the reaction condition method is carried out. In particular, for each DNA sample contacted with the foregoing compositions, the contacted DNA samples are incubated at 95 degrees Celsius for 5 minutes, this is followed by 30 cycles of heating and cooling to 95 degrees Celsius for 30 seconds and 60 degrees Celsius for 45 seconds. Finally, replication of the CP was carried out via conventional RCA. Fluorescence was then measured simultaneous to RCA as shown by lines corresponding to each composition as identified in the graph, where fluorescence is measure over time corresponding to the replication of the CP.

FIG. 12 shows that reaction condition compositions including 0.1 µM of the at least two primers and 0.5 µM of the at least two primers can detect SNPs on the bovine beta casein gene. This indicates that primers from 0.1 to 0.5 µM in the reaction condition composition can detect genomic variations.

Figure 13:
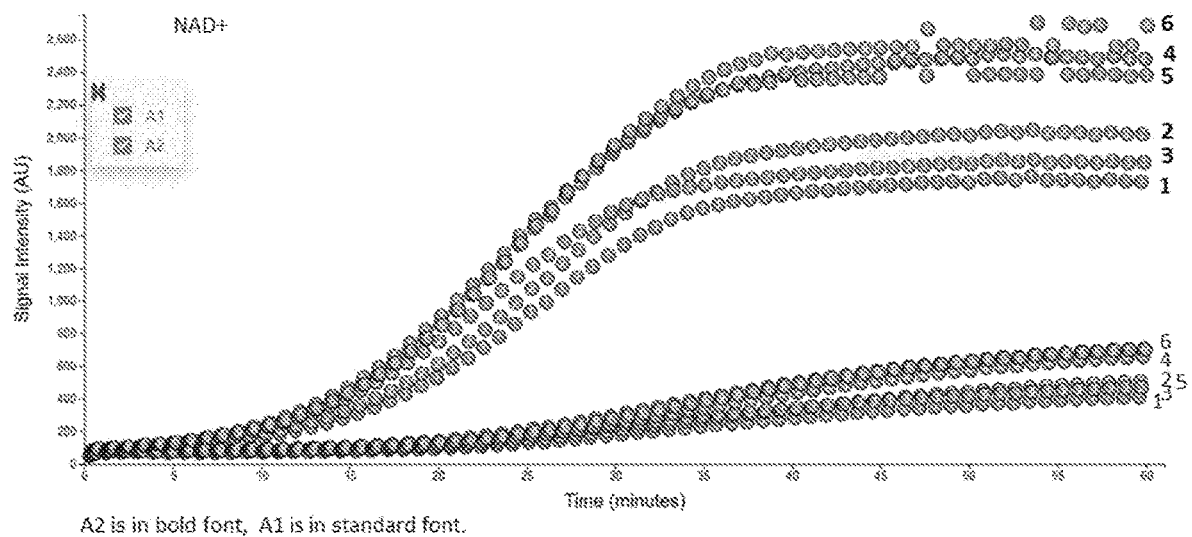
FIG. 13 is an example of the efficacy of the reaction condition composition with varying concentrations of NAD+.

FIG. 13 is an example of the efficacy of the reaction condition composition with varying concentrations of NAD+. In this example a genetic variations are detected on the beta casein bovine gene, represented by A1 and A2. The genetic variations of the beta case gene are from a heterozygous sample, such that the A1 and A2 alleles will be detected. FIG. 13 includes a legend identifying A1 and A2. In this example, A2 allele yields stronger detection than the A1 allele but both are detected if the reaction works.

Referring to FIG. 13, the reaction condition composition of tubes labeled 1-3 included 5 units of DNA ligase (Ampligase), 0.8 units of DNA polymerase (Taq polymerase), 0.1 µM each of two COPs having a sequence complimentary to the target sequence of each allele of the beta casein SNP, DNA polymerase buffer of 10 mM Tris-HCl (pH 8.3), 50 mM KCl, 1.5 mM MgCl2, and 0.1 mM NAD+, 0.1 mM of dNTP mix, and 0.25 µM each of two primers specific (complimentary) to the replication sequence of the sample DNA. The reaction condition composition was contacted with 2 ul (10 ng) of sample DNA from the heterozygous bovine. All concentrations are final.

The reaction condition composition of tube labeled 4-6 included 5 units of DNA ligase (Ampligase), 0.8 units of DNA polymerase (Taq polymerase), 0.1 µM each of two COPs having a sequence complimentary to the target sequence of each allele of the beta casein SNP, DNA polymerase buffer of 10 mM Tris-HCl pH 8.3, 50 mM KCl, 1.5 mM MgCl2, and 1.5 mM NAD+, 0.2 mM of dNTP mix, and 0.25 µM each of two primers specific (complimentary) to the replication sequence of the sample DNA. The reaction condition composition was contacted with 2 ul (10 ng) of sample DNA from the heterozygous animal. All concentrations are final.

After contacting the foregoing compositions to the DNA sample, the remainder of the reaction condition method is carried out. In particular, for each DNA sample contacted with the foregoing compositions, the contacted DNA samples are incubated at 95 degrees Celsius for 5 minutes, this is followed by 30 cycles of heating and cooling to 95 degrees Celsius for 30 seconds and 60 degrees Celsius for 45 seconds. Finally, replication of the CP was carried out via conventional RCA. Fluorescence was then measured simultaneous to RCA as shown by lines corresponding to each composition as identified in the graph, where fluorescence is measure over time corresponding to the replication of the CP.

FIG. 13 shows that reaction condition compositions including 0.1 mM of the NAD+ and 1.5 mM of the NAD+ can detect SNPs on the bovine beta casein gene. This indicates that NAD+ from 0.1 mM to 1.5 mM in the reaction condition composition can detect genomic variations.

Figure 14:
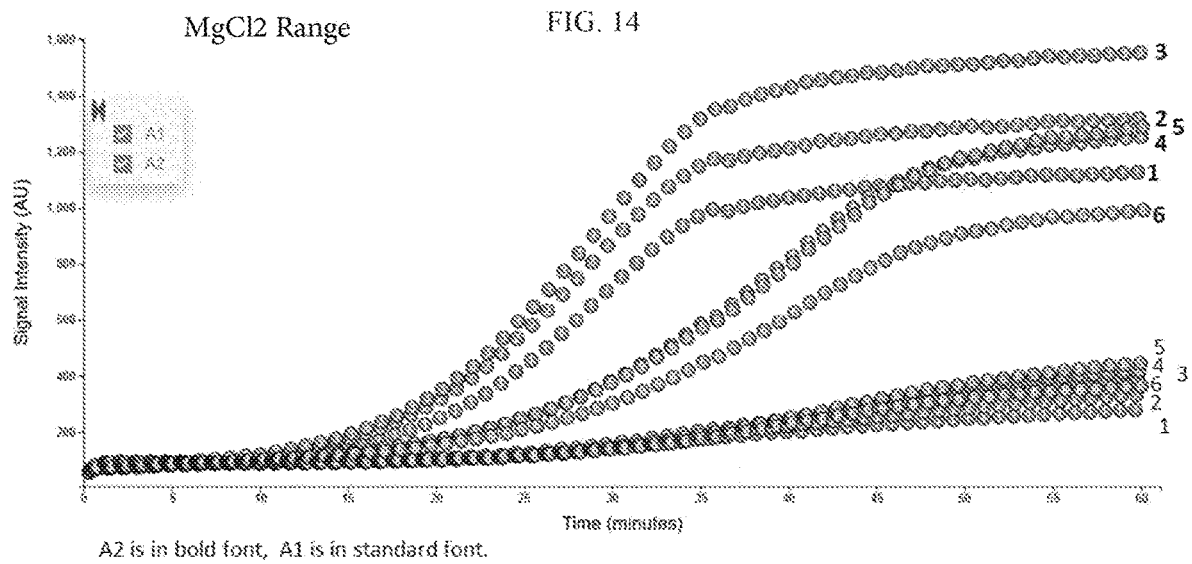
FIG. 14 is an example of the efficacy of the reaction condition composition with varying concentrations of the $MgCl_2$ of the DNA polymerase buffer.

FIG. 14 is an example of the efficacy of the reaction condition composition with varying concentrations of the $MgCl_2$ of the DNA polymerase buffer. In this example a genetic variations are detected on the beta casein bovine gene, represented by A1 and A2. The genetic variations of the beta case gene are from a heterozygous sample, such that the A1 and A2 alleles will be detected. FIG. 14 includes a legend identifying A1 and A2. In this example, the A2 allele yields stronger detection than the A1 allele but both are detected if the reaction works.

Referring to FIG. 14, the reaction condition composition of tubes labeled 1-3 included 5 units of DNA ligase (Ampligase), 0.8 units of DNA polymerase (Taq polymerase), 0.1 µM each of two COPs having a sequence complimentary to the target sequence of each allele of the beta casein SNP, DNA polymerase buffer of 10 mM Tris-HCl (pH 8.3), 50 mM KCl, 1.5 mM MgCl2, 0.25 mM NAD+, 0.1 mM of dNTP mix, and 0.25 µM each of two primers specific (complimentary) to the replication sequence of the sample DNA. The reaction condition composition was contacted with 2 ul (10 ng) of sample DNA from the heterozygous bovine. All concentrations are final.

The reaction condition composition of tube labeled 4-6 included 5 units of DNA ligase (Ampligase), 0.8 units of DNA polymerase (Taq polymerase), 0.1 µM each of two COPs having a sequence complimentary to the target sequence of each allele of the beta casein SNP, DNA polymerase buffer of 10 mM Tris-HCl pH 8.3, 50 mM KCl, 4.0 mM MgCl2, 0.25 mM NAD+, 0.2 mM of dNTP mix, and 0.25 µM each of two primers specific (complimentary) to the replication sequence of the sample DNA. The reaction condition composition was contacted with 2 ul (10 ng) of sample DNA from the heterozygous animal. All concentrations are final.

After contacting the foregoing compositions to the DNA sample, the remainder of the reaction condition method is carried out. In particular, for each DNA sample contacted with the foregoing compositions, the contacted DNA samples are incubated at 95 degrees Celsius for 5 minutes; this is followed by 30 cycles of heating and cooling to 95 degrees Celsius for 30 seconds and 60 degrees Celsius for 45 seconds. Finally, replication of the CP was carried out via conventional RCA. Fluorescence was then measured simultaneous to RCA as shown by lines corresponding to each composition as identified in the graph, where fluorescence is measure over time corresponding to the replication of the CP.

FIG. 14 shows that reaction condition compositions including the DNA polymerase buffer having a concentration of and 1.5 mM to 4.0 mM MgCl$_2$ can detect SNPs on the bovine beta casein gene. This indicates that MgCl$_2$ from 1.5 mM to 4.0 mM in the DNA polymerase buffer of the reaction condition composition can detect genomic variations.

Figure 15:
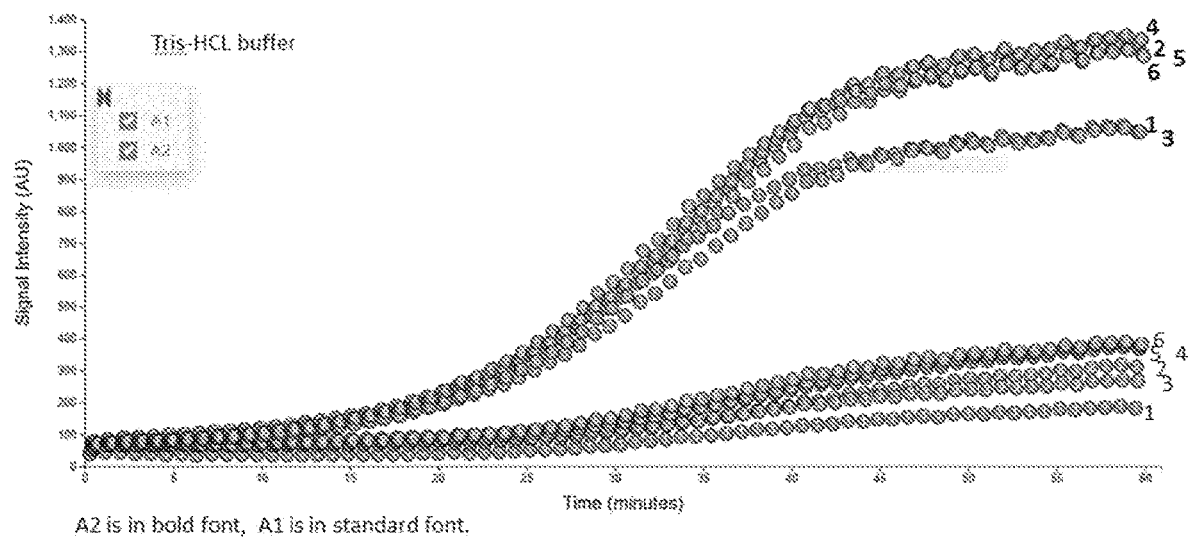
FIG. 15 is an example of the efficacy of the reaction condition composition with varying concentrations of Tris-HCl as part of the DNA polymerase buffer.

FIG. 15 is an example of the efficacy of the reaction condition composition with varying concentrations of Tris-HCl as part of the DNA polymerase buffer. In this example genetic variations are detected on the beta casein bovine gene, represented by A1 and A2. The genetic variations of the beta case gene are from a heterozygous sample, such that the A1 and A2 alleles will be detected. FIG. 15 includes a legend identifying A1 and A2. In this example, the A2 allele yields stronger detection than the A1 allele but both are detected if the reaction works.

Referring to FIG. 15, the reaction condition composition of tubes labeled 1-3 included 5 units of DNA ligase (Ampligase), 0.8 units of DNA polymerase (Taq polymerase), 0.1 µM each of two COPs having a sequence complimentary to the target sequence of each allele of the beta casein SNP, DNA polymerase buffer of 10 mM Tris-HCl (pH 8.3), 50 mM KCl, 1.5 mM MgCl$_2$, 0.25 mM NAD+, 0.1 mM of dNTP mix, and 0.25 µM each of two primers specific (complimentary) to the replication sequence of the sample DNA. The reaction condition composition was contacted with 2 ul (10 ng) of sample DNA from the heterozygous bovine. All concentrations are final.

The reaction condition composition of tube labeled 4-6 included 5 units of DNA ligase (Ampligase), 0.8 units of DNA polymerase (Taq polymerase), 0.1 µM each of two COPs having a sequence complimentary to the target sequence of each allele of the beta casein SNP, DNA polymerase buffer of 15 mM Tris-HCl pH 8.3, 50 mM KCl, 1.5 mM MgCl2, 0.25 mM NAD+, 0.2 mM of dNTP mix, and 0.25 µM each of two primers specific (complimentary) to the replication sequence of the sample DNA. The reaction condition composition was contacted with 2 ul (10 ng) of sample DNA from the heterozygous animal. All concentrations are final.

After contacting the foregoing compositions to the DNA sample, the remainder of the reaction condition method is carried out. In particular, for each DNA sample contacted with the foregoing compositions, the contacted DNA samples are incubated at 95 degrees Celsius for 5 minutes. This is followed by 30 cycles of heating and cooling to 95 degrees Celsius for 30 seconds and 60 degrees Celsius for 45 seconds. Finally, replication of the CP was carried out via conventional RCA. Fluorescence was then measured simultaneous to RCA as shown by lines corresponding to each composition as identified in the graph, where fluorescence is measure over time corresponding to the replication of the CP.

FIG. 15 shows that reaction condition compositions including the DNA polymerase buffer having a concentration from 10 mM to 15 mM Tris-HCl can detect SNPs on the bovine beta casein gene. This indicates that Tris-HCl from 10 mM to 15 mM in the DNA polymerase buffer of the reaction condition composition can detect genomic variations.

Figure 16:
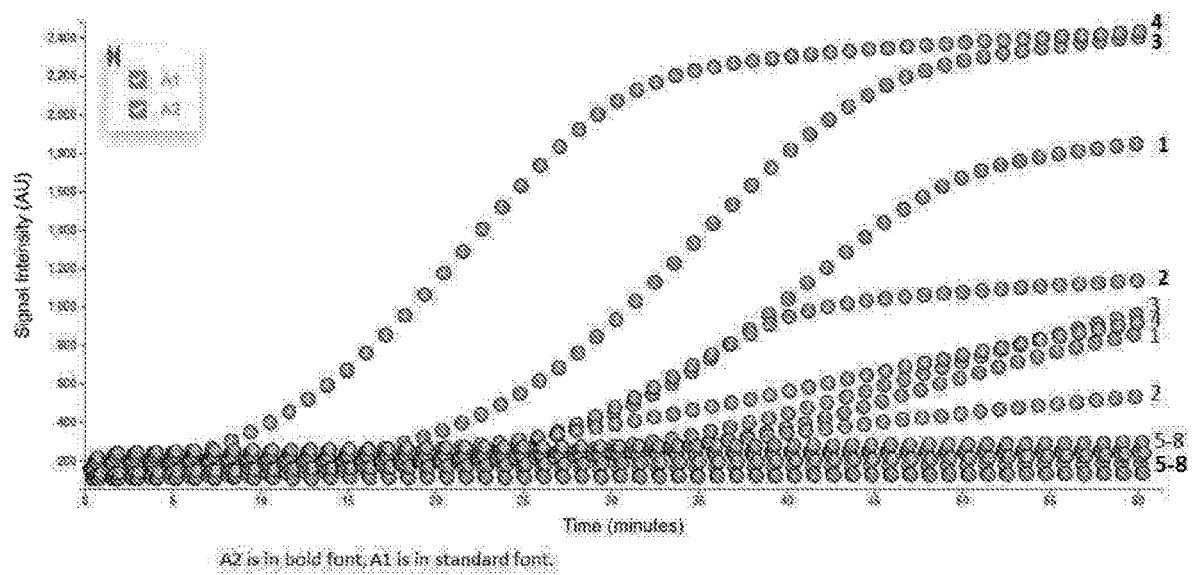
FIG. 16 is an example of the efficacy of the at least two primers and DNA polymerase of the reaction condition composition versus a reaction condition composition without the at least two primers and DNA polymerase.

FIG. 16 is an example of the efficacy of the at least two primers and DNA polymerase of the reaction condition composition versus a reaction condition composition without the at least two primer and DNA polymerase. In this example genetic variations are detected on the beta casein bovine gene, represented by A1 and A2. The genetic variations of the beta case gene are from a heterozygous sample, such that the A1 and A2 alleles will be detected. FIG. 16 includes a legend identifying A1 and A2. In this example, the A2 allele yields stronger detection than the A1 allele but both are detected if the reaction works.

Referring to FIG. 16, the reaction condition composition (labeled RCC in FIG. 16) of tubes labeled 1-4 included 5 units of DNA ligase (Ampligase), 0.8 units of DNA polymerase (Taq polymerase), 0.1 µM each of two COPs having a sequence complimentary to the target sequence of each allele of the beta casein SNP, DNA polymerase buffer of 10 mM Tris-HCl (pH 8.3), 50 mM KCl, 1.5 mM MgCl2, 0.25 mM NAD+, 0.1 mM of dNTP mix, and 0.25 µM each of two primers specific (complimentary) to the replication sequence of the sample DNA. Tubes 1-4 having reaction condition composition were contacted with 5 ng, 10 ng, 20 ng, and 1 ug of sample DNA from the heterozygous bovine, respectively. All concentrations are final.

The reaction condition composition of tube labeled 5-8 included 5 units of DNA ligase (Ampligase), 0.1 µM each of two COPs having a sequence complimentary to the target sequence of each allele of the beta casein SNP, DNA polymerase buffer of 15 mM Tris-HCl pH 8.3, 10 mM KCl, 1.5 mM MgCl2, 0.25 mM NAD+, and 0.2 mM of dNTP mix. Tube 5-8 having the reaction condition composition without the DNA polymerase and at least two primers were with 5 ng, 10 ng, 20 ng, and 1 ug of sample DNA from the heterozygous bovine, respectively. All concentrations are final.

After contacting the foregoing compositions to the DNA sample, the remainder of the reaction condition method is carried out. In particular, for each DNA sample contacted with the foregoing compositions, the contacted DNA samples are incubated at 95 degrees Celsius for 5 minutes. This is followed by 30 cycles of heating and cooling to 95 degrees Celsius for 30 seconds and 60 degrees Celsius for 45 seconds. Finally, replication of the CP was carried out via conventional RCA. Fluorescence was then measured simultaneous to RCA as shown by lines corresponding to each composition as identified in the graph, where fluorescence is measure over time corresponding to the replication of the CP.

FIG. 16 shows that the reaction condition composition without the DNA polymerase and at least two primers does not produce detectable results for the SNPs on the bovine beta casein gene. This indicates that the DNA polymerase and at least two primers are necessary for the reaction condition composition and method.

The invention claimed is:

1. A reaction condition composition for hybridization and ligation of circularizing oligonucleotide probes comprising:
   a DNA ligase from 1 to 5 units;
   a DNA polymerase from 0.2 to 2.5 units;
   at least one circularizing oligonucleotide probe having a final concentration in the reaction condition composition after contact with a deoxyribose nucleic acid (DNA) sample from 0.0125 to 0.3 micromolar, wherein the at least one circularizing oligonucleotide probe is specific to a first genomic variation;
   a deoxyribonucleic acid buffer capable of maintaining a pH from 7 to 9;
   NAD+ having a final concentration in the reaction condition composition after contact with the DNA sample from 0.1 to 1.4 millimolar;
   at least two primers having a final concentration in the reaction condition composition after contact with the DNA sample from 0.1 to 0.5 micromolar, wherein the at least two primers are specific to a first replication sequence; and deoxynucleotide triphosphates having a final contraction in the reaction condition composition after contact with the DNA sample from 0.1 to 0.2 millimolar, wherein the reaction condition composition does not require an intermediary step of reducing un-ligated circularizing oligonucleotide probes and is a single composition configured to conduct ligation and amplification of the at least one circularizing oligonucleotide probe simultaneously.

2. The reaction condition composition of claim 1, wherein the DNA ligase is 5 units;
the DNA polymerase is 0.8 units;
the at least one circularizing oligonucleotide probe has a final concentration in the reaction condition composition after contact with the DNA sample of 0.1 micromolar;
the NAD+ has a final concentration in the reaction condition composition after contact with the DNA sample of 0.25 millimolar;
the at least two primers have a final concentration in the reaction condition composition after contact with the DNA sample of 0.25 micromolar;
the deoxynucleotide triphosphates have a final concentration in the reaction condition composition after contact with the DNA sample from 0.1 millimolar.

3. The reaction condition composition of claim 1, wherein the DNA polymerase buffer comprises
tris-hydrochloride having a final concentration in the reaction condition composition after contact with the DNA sample from 10 millimolar to 15 millimolar;
potassium chloride having a final concentration in the reaction condition composition after contact with the DNA sample from 50 millimolar to 60 millimolar; and
magnesium chloride having a final concentration in the reaction condition composition after contact with the DNA sample from 1.5 millimolar to 4 millimolar.

4. The composition of claim 1, wherein the DNA ligase is thermostable.

5. The composition of claim 1, wherein the DNA ligase is NAD+ dependent.

6. The composition of claim 1, wherein the DNA polymerase is thermostable.

7. The composition of claim 1, wherein the DNA polymerase is taq polymerase.

8. The composition of claim 1, further comprising
a first circularizing oligonucleotide probe, wherein
the first circularizing oligonucleotide probe is specific to the genomic variation;
a second circularizing oligonucleotide probe, wherein
the second circularizing oligonucleotide probe is specific to a second genomic variation;
a first primer and a second primer,
wherein the first primer and the second primer are specific to the first replication sequence; and
a third primer and a fourth primer,
wherein the third primer and fourth primer are specific to a second replication sequence.

9. A method for hybridization and ligation of circularizing oligonucleotide probes for detection of a genomic target comprising:
contacting a reaction condition composition that does not require an intermediary step of reducing un-ligated circularizing oligonucleotide probes and is a single composition configured to conduct ligation and amplification of an at least one circularizing oligonucleotide probe simultaneously with a deoxyribose nucleic acid (DNA) sample having the genomic target, where the reaction condition composition comprises
the least one circularizing oligonucleotide probe specific to the genomic variation;
hybridizing the circularizing oligonucleotide probe to the genomic variation, wherein the hybridizing includes heating the sample contacted with the reaction condition composition from 90 to 95 degrees Celsius;
ligating the hybridized circularized circularizing oligonucleotide probe to form a circularized probe, wherein the ligating includes cyclical heating and cooling of the reaction condition composition contacted sample;
replicating the circularized probe for detection;
detecting the circularized probe to identify the genomic variation.

10. The method of claim 9, wherein
the cyclical heating and cooling comprises
from 10 to 60 cycles of heating and cooling from 90 to 95 degrees Celsius for approximately 30 seconds and from 40 to 60 degrees Celsius for approximately 45 seconds.

11. The method of claim 9, wherein
the cyclical heating and cooling comprises
30 cycles of heating and cooling to 95 degrees Celsius for approximately 30 seconds and to 60 degrees Celsius for approximately 45 seconds.

12. The method of claim 9, wherein replicating the circularized probe for detection comprises rolling circle amplification.

13. The method of claim 12, wherein the detection of the circularized probe to identify the genomic variation comprises adding fluorescent labeled primers to hybridize to the replicated circularized probe for fluorescence detection.

14. The method of claim 9, wherein
the reaction condition composition comprises
a DNA ligase from 1 to 5 units;
a DNA polymerase from 0.2 to 2.5 units;
at least one circularizing oligonucleotide probe having
a final concentration in the reaction condition composition after contact with the DNA sample from 0.1 to 0.3 micromolar, wherein
the at least one circularizing oligonucleotide probe is specific to a first genomic variation;
a deoxyribonucleic acid buffer capable of maintaining a pH from 7 to 9;
NAD+ having a final concentration in the reaction condition composition after contact with the DNA sample from 0.1 to 1.4 millimolar;
at least two primers having a final concentration in the reaction condition composition after contact with the DNA sample from 0.1 to 0.5 micromolar,
wherein the at least two primers are specific to a first replication sequence; and
deoxynucleotide triphosphates having a final contraction in the reaction condition composition after contact with the DNA sample of from 0.1 to 0.2 millimolar.

15. A reaction condition composition kit, comprising:
a tube;
a dehydrated reaction condition composition, the dehydrated reaction condition composition being a single composition configured for ligating and amplifying at least one circularizing oligonucleotide probe simultaneously and does not require an intermediary step of reducing un-ligated circularizing oligonucleotide probes and, wherein the dehydrated reaction condition composition is contained in the tube;

a rehydration buffer container;
a rehydration buffer, wherein the rehydration buffer is contained in the rehydration buffer container;
instructions configured for performing a reaction condition composition method; and
a container configured to contain, the tube, the rehydration buffer container, and the instructions.

16. The kit of claim 15, wherein
the rehydration buffer is sterile water.

17. The kit of claim 16, wherein
the dehydrated reaction condition composition is of a mass for performing at least 8 reactions using the reaction condition composition.

\* \* \* \* \*